United States Patent [19]

Vajda

[11] Patent Number: 4,755,088

[45] Date of Patent: Jul. 5, 1988

[54] HOLE SAW UNJAMMING TOOL

[75] Inventor: Jayson Vajda, 60 Parker Street, Scranton, Pa. 18408

[73] Assignees: Jayson Vajda; Joyce Vajda, both of Scranton, Pa.

[21] Appl. No.: 87,757

[22] Filed: Aug. 21, 1987

[51] Int. Cl.[1] .................................... B23B 51/04
[52] U.S. Cl. .................................. 408/68; 408/204; 408/206; 408/703
[58] Field of Search ............ 144/20, 21, 23; 408/68, 408/204, 206, 209, 223–225, 703, 713, 226

[56] References Cited

U.S. PATENT DOCUMENTS 2,349,400  5/1944  Beckwith ........................ 408/206
2,484,150 10/1949  Brown ............................. 408/68
4,669,928  6/1987  Mediavilla ........................ 408/68

Primary Examiner—Gil Weidenfeld
Assistant Examiner—Steven C. Bishop
Attorney, Agent, or Firm—Joseph W. Molasky & Assocs.

[57] ABSTRACT

A tool for unjamming the material jammed in a hole saw includes an adapter member constructed to be received within the interior of a cup-shaped cutter and providing at one end an enlarged head for contacting the jammed material to be removed and a slide hammer adapted to be interlocked with the other end of the adapter member for applying the force required to remove the adapter member and the jammed material from the interior of the hole saw cutter.

15 Claims, 3 Drawing Sheets

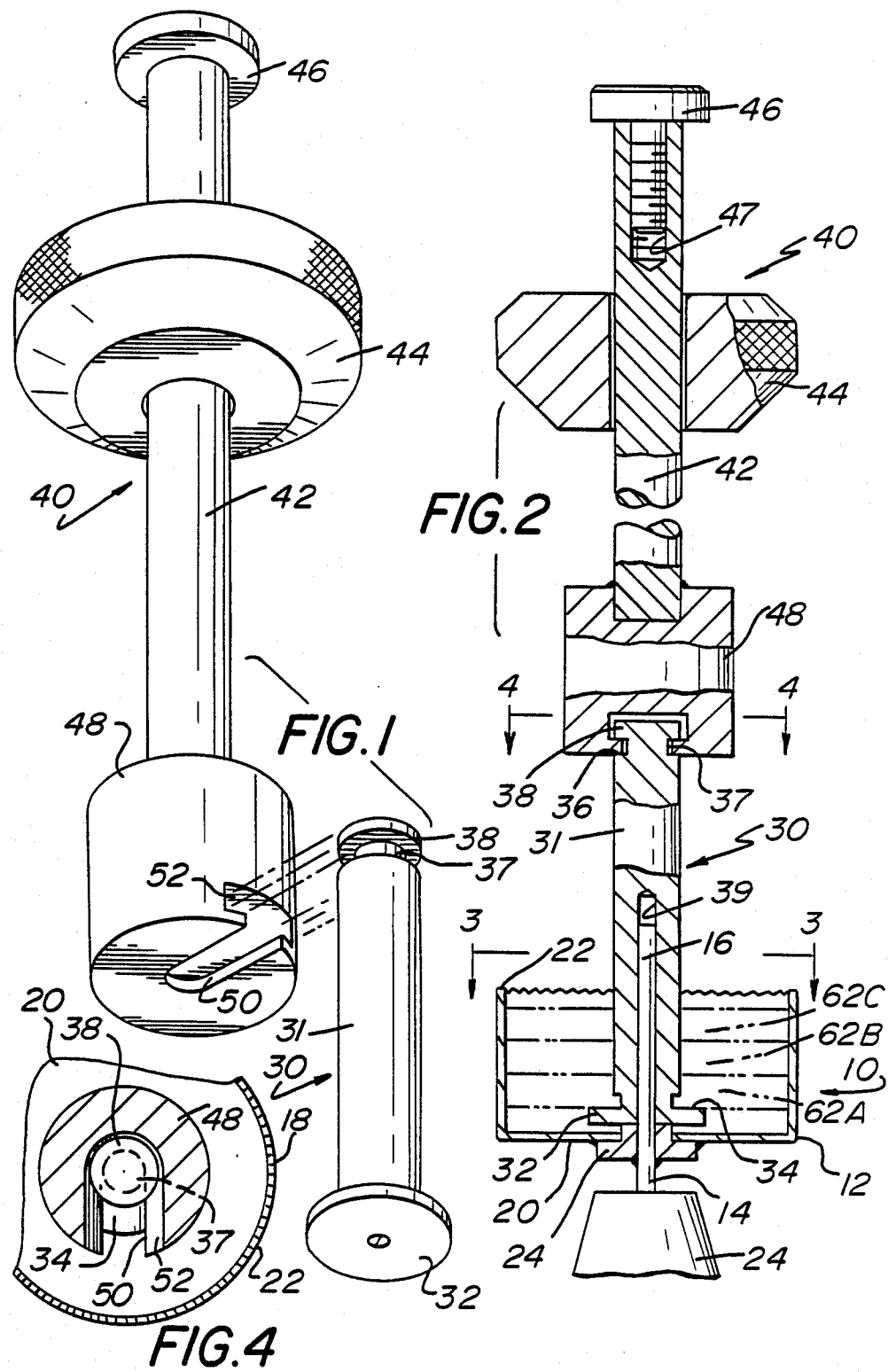

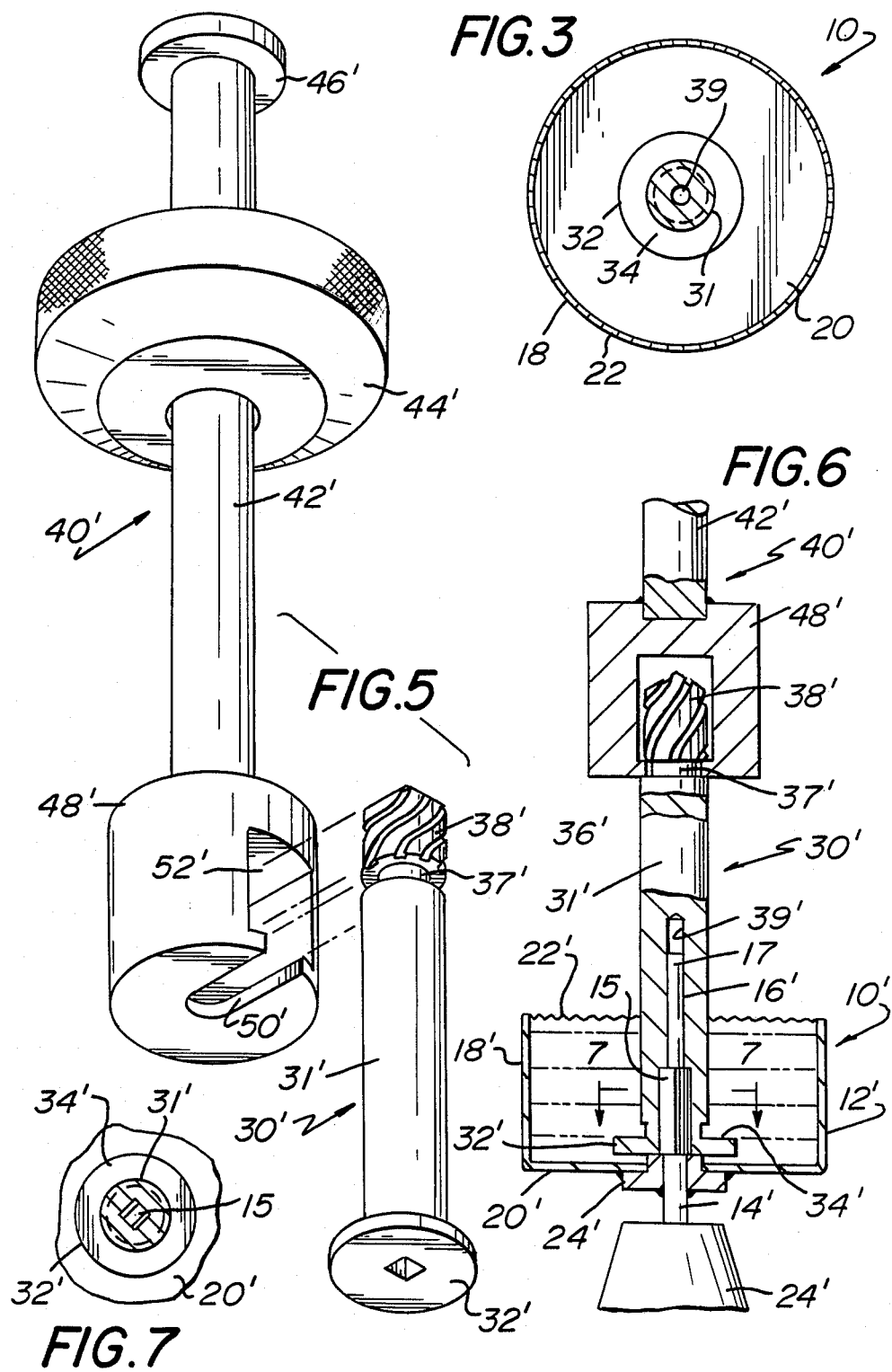

HOLE SAW UNJAMMING TOOL

BACKGROUND OF THE INVENTION

1. Field of the Invention

This invention relates to the field of hole saws of the type having a cup-shaped cutter, a drive shaft and a centering rod extending within the interior of the cutter along the central axis thereof. A common problem in the use of hole saws is that the material cut by the cutter accummulates and becomes jammed in the interior of the cup-shaped cutter and eventually has to be removed by a cumbersome and time consuming operation.

2. Description of the Prior Art

The hole saws in use today are usually provided with holes in the base or side of the cup-shaped cutter which permit the insertion of a nail, screwdriver or other tool for pushing out the jammed material in the interior of the cutter. However, this unjamming method is not entirely satisfactory. Firstly, the procedure is time consuming and difficult to perform. Secondly, the procedure often results in damage to the drill or hole saw, especially when performed while the hole saw is secured on the drill.

SUMMARY OF THE INVENTION

It is the general object of the invention to provide a novel hole saw unjamming tool for use with hole saws of the above-indicated type which can be used to remove the jammed material within the interior of the cup-shaped cutter with ease and in a minimum amount of time without disengaging the hole saw from the drill.

Briefly stated, the hole saw unjamming tool of the invention is designed for use with a hole saw having a cup-shaped cutter, a drive shaft and a centering rod extending within the interior of the cutter along the central axis thereof. The hole saw unjamming tool of the invention comprises an adapter member including an elongated shank adapted to be received in a bore formed in the material to be cut, an enlarged head forming a shoulder at one end of the shank for use in removing the jammed material, and an interlock means formed at the other end of the shank. The hole saw unjamming tool also comprises a slide hammer which includes an elongated slide shaft, a weight slidably mounted on the slide shaft, a stop at one end of the slide shaft for arresting the movement of the weight therealong, and an interlock means formed at the other end of the slide shaft adapted to be engaged with the interlock means of the adapter member. The adapter member has a bore in the end thereof provided with the enlarged head, the bore being adapted to slidably receive the centering rod of the hole saw so that the adapter member can be placed within the interior of the cup-shaped cutter prior to a cutting operation and positioned for removing jammed pieces of material resulting from a hole cutting operation.

BRIEF DESCRIPTION OF THE DRAWINGS

FIG. 1 is a perspective view of a hole saw unjamming tool in accordance with the present invention.

FIG. 2 is a longitudinal sectional view of the tool shown in FIG. 1.

FIG. 3 is a sectional view taken on line 3—3 of FIG. 2.

FIG. 4 is a sectional view taken on line 4—4 of FIG. 2.

FIG. 5 is a perspective view of a second embodiment of the invention.

FIG. 6 is a longitudinal sectional view of the hole saw unjamming tool shown in FIG. 5.

FIG. 7 is a sectional view taken on line 7—7 of FIG. 6.

DETAILED DESCRIPTION OF THE PREFERRED EMBODIMENTS

Figure 8:
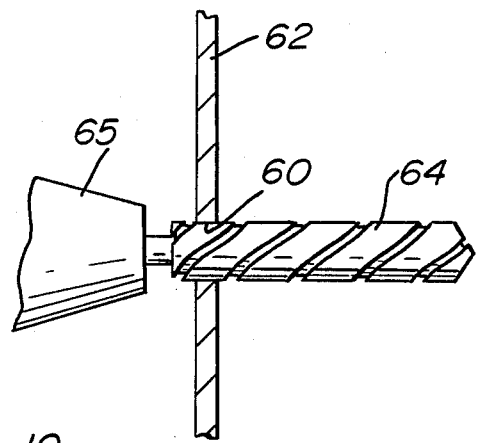
FIGS. 8, 9 and 10 show sequential steps in the use of the hole saw unjamming tool in accordance with the invention.

One embodiment of the hole saw unjamming tool in accordance with the invention is shown in FIGS. 1-4. This embodiment is designed for use with a hole saw 10 having a cup-shaped cutter 12, a cylindrical drive shaft 14 and a cylindrical centering rod 16. Cutter 12 comprises a cylindrical sidewall 18 and a circular base 20 and has cutting teeth 22 formed at the outer end of the sidewall 18. Drive shaft 12 and centering rod 16 are formed as a unitary structure with centering rod 16 providing an extension of the drive shaft 14 and extending within the interior of the cup-shaped portion of cutter 12 along the central axis thereof (i.e., the axis of rotation). Drive shaft 14 is secured, as by welding, to a hub 24 fixedly mounted to the central portion of circular base 20, as is best shown in FIG. 2. The outer end of drive shaft 14 is adapted to be secured within a chuck 24 of a conventional drill, as is shown in FIG. 4 and in FIGS. 9 and 10 to be described hereafter.

The hole saw unjamming tool of the invention comprises an adapter member 30 which has an elongated cylindrical shank 31 adapted to be received in a bore formed in the material to be cut. At one end of shank 31 there is provided an enlarged head 32 constructed and arranged to provide an annular shoulder 34 for contacting the jammed material within the interior of the cutter 12, as will be described hereafter. At the other end of shank 31 there is formed an interlock means for a purpose to be described more fully hereafter. This interlock means comprises an annular recess 36 spaced a short distance inwardly from the tip end of adapter member 30 to form a cylindrical recessed portion 37 and an annular rim portion 38 at the tip end of the shank 31 of adapter member 30. Adapter member 30 has an elongated bore 39 in the end thereof provided with the enlarged head 32, bore 39 being adapted to slidably receive the centering rod 16 of the hole saw 10, as is apparent from a consideration of FIG. 2.

The hole saw unjamming tool of the invention also comprises a slide hammer 40 which includes an elongated cylindrical slide shaft 42 and a weight 44 slidably mounted on the slide shaft 42. Slide hammer 40 is constructed in a manner similar to conventional tools of this type and comprises a stop 46 at one end of the slide shaft 42 for arresting movement of weight 44 along slide shaft 42 in the upward direction as viewed in FIGS. 1 and 2. As is shown in FIG. 2, stop 46 is formed by a bolt which is threadedly received in a threaded bore 47 in the upper end of the slide shaft 42.

An enlarged head 48 is secured at the lower end of slide shaft 42 and comprises an enlarged cylindrical portion which arrests movement of the weight 44 in the downward direction along slide shaft 42. The enlarged head 48 at the lower end of slide shaft 42 has formed therein an interlock means adapted to be engaged with the interlock means of adapter member 30 as is apparent from a consideration of FIGS. 1, 2 and 4. The construction is such that the interlock means of adapter member 30 and the interlock means of slide hammer 40 are adapted to be releasably engageable to provide a quick-connect/disconnect coupling. To this end, the interlock means of the slide hammer 40 comprises a slot 50 adapted to slidably receive the recessed portion 37 of adapter member 30 and a cavity 52 adapted to receive the rim portion 38 of adapter member 30 to form an interlocked connection between the upper end of shank 31 and the lower end of slide shaft 42 (FIG. 2).

The use of the hole saw unjamming tool disclosed in FIGS. 1-4 will be described with reference to FIGS. 8, 9 and 10. The first step in the use of the tool is shown in FIG. 8, wherein there is shown the step of drilling a pilot hole 60 in the material 62 to be cut by the use of a conventional drill which has a conventional drill bit 64 secured in its chuck 65. The predrilled pilot hole 60 acts as a centering guide for the hole saw cutter 10 during a hole cutting operation.

Figure 9:
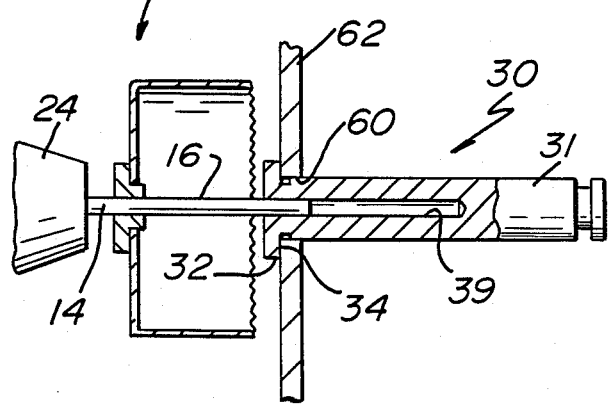

The next step is illustrated in FIG. 9 and involves placing the adapter member 30 into the predrilled pilot hole 60 to a position as shown in FIG. 9 with the shoulder 34 of enlarged head 32 in contact with the one side of the material 62 to be cut and with the shank 31 extending through the predrilled hole 60 to extend from the other side of the material 62 to be cut. In this step, the hole saw 10 is secured in the chuck 24 of a drill and is positioned in the hole cutting position by inserting the centering rod 16 in the bore 39 of the adapter member 30 as shown.

Figure 10:
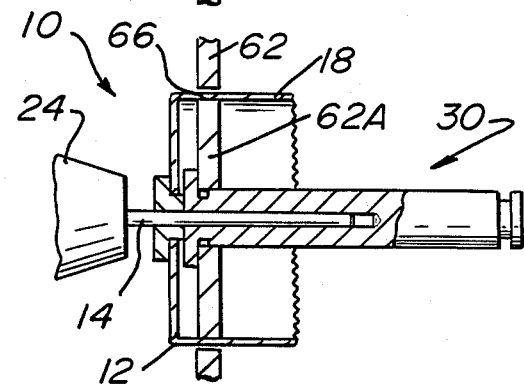

The next step is illustrated in FIG. 10, which shows the results of a cutting operation wherein a hole 66 is cut in the material 62 and the piece 62A cut from the material 62 is jammed in the interior of the cup-shaped cutter 12 in frictional engagement with the inner side of sidewall 18. In usage, the tool may be used to cut a plurality of holes to accummulate three pieces of material 62A, 62B and 62C to produce an arrangement as best shown in FIG. 2.

The next step is to remove the jammed material from the hole saw cutter 12 by the use of the tool in accordance with the invention. In this step, slam hammer 40 is connected to adapter member 30 by the quick-connect/disconnect interlocking means as described above to a position as shown in FIG. 2. The connection procedure is illustrated in FIG. 1 whereby the parts are moved transversely into engagement with the cavity 52 and slot 50 of slide hammer 40 receiving the rim portion 38 and recessed portion 37 of the adapter member 70 as is apparent from a consideration of FIG. 1.

The final step in the unjamming operation is to apply a force to the adapter member 30 in the direction causing the adapter member 30 to slide on centering rod 16 away from the base 20 of the cutter 12 so as to thereby remove the pieces of material 62A, 62B and 62C jammed therein by reason of the contact therewith by the enlarged head 32. The user can use various techniques depending on the nature of the jammed condition. Typically the hammer weight 44 is slid back and forth along slide shaft 42 to apply one or more upward collisions with the stop 46 to thereby produce a force pulling the adapter member 30 and the jammed pieces of material out of the interior of the cutter 12. Also, once the pieces of material become loosened sufficiently, the user can often remove them by applying a pulling action to the slam hammer 40.

In FIGS. 5-7 there is shown a second embodiment of the invention which is similar to the embodiment shown in FIGS. 1-4 wherefore corresponding parts have been given like reference numerals with primes added. The embodiment of FIGS. 5-7 differs from the embodiment of FIGS. 1-4 in only two essential ways. First, the embodiment of FIGS. 5-7 is provided with a drill bit at the outer end of the adapter member for use in drilling the pilot hole for the hole saw. Second, the parts are constructed and arranged to provide for the conjoint rotation of the hole saw and the adapter member having the drill bit end.

The hole saw unjamming tool in accordance with the invention shown in FIGS. 5-7 is designed for use with a hole saw 10' having a cup-shaped cutter 12', a cylindrical drive shaft 14' and a centering rod 16' having a cylindrical end portion 17 and a straight-sided portion 15 having a square-shaped cross section. Cutter 12' comprises a cylindrical sidewall 18' and a circular base 20' and has cutting teeth 22' formed at the outer end of the sidewall 18'. Drive shaft 12' and centering rod 16' are formed as a unitary structure with centering rod 16' providing an extension of drive shaft 14'. The square-shaped portion 15 and the cylindrical end portion 17 of centering rod 16' extend within the interior of the cup-shaped portion of cutter 12' along the central axis thereof (i.e., the axis of rotation). Drive shaft 14' is secured, by welding, to a hub 24' fixedly mounted to the central portion of circular base 20' as best shown in FIG. 6. The outer end of drive shaft 14' is adapted to be secured within a chuck 24' of a conventional drill as is shown in FIG. 6.

The hole saw unjamming tool of the invention comprises an adapter member 30' which has an elongated cylindrical shank 31' adapted to be received in a bore formed in the material to be cut. At one end of shank 31' there is provided an enlarged head 32' constructed and arranged to provide an annular shoulder 34' for contacting the jammed material within the interior of the cutter 12', as will be described hereafter. At the other end of shank 31' there is formed an interlock means for a purpose to be described more fully hereafter. This interlock means comprises an annular recess 36' spaced a short distance inwardly from the tip end of adapter member 30' to form a cylindrical recessed portion 37' and a drill bit portion 38' at the tip end of the shank 31' of adapter member 30'. Drill bit portion 38' has helical cutting flutes formed therein like a conventional drill bit. Adapter member 30' has an elongated bore 39' in the end thereof provided with the enlarged head 32'. The inner end of bore 39' is adapted to slidably receive end portion 17 of the centering rod 16' of the hole saw 10'. The outer end of bore 39' is squareshaped for receiving portion 15 of centering rod 16' to provide for driving engagement therebetween whereby hole saw 10' and adapter member 30' are engaged for conjoint rotation when positioned as shown in FIG. 6.

The hole saw unjamming tool of the invention also comprises a slide hammer 40' which includes an elongated cylindrical slide shaft 42' and a weight 44' slidably mounted on slide shaft 42'. Slide hammer 40' is constructed in a manner similar to conventional tools of this type and comprises a stop 46' at one end of the slide shaft 42' for arresting movement of weight 44' along slide shaft 42' in the upward direction as viewed in FIG. 5. Stop 46' is formed by a bolt which is threadedly received in a threaded bore in the upper end of the slide shaft 42'.

An enlarged head 48' is secured at the lower end of slide shaft 42' and comprises an enlarged cylindrical portion which arrests movement of the weight 44' in the downward direction along slide shaft 42'. The enlarged head 48' at the lower end of slide shaft 42' has formed therein an interlock means adapted to be engaged with the interlock means of adapter member 30' as is apparent from a consideration of FIGS. 5 and 6. The construction is such that the interlock means of adapter member 30' and the interlock means of slide hammer 40' are adapted to be releasably engageable to provide a quick-connect/disconnect coupling. To this end, the interlock means of the slide hammer 40' comprises a slot 50' adapted to slidably receive the recessed portion 37' of adapter member 30' and a cavity 52' adapted to receive the drill bit portion 38' of adapter member 30' to form an interlocked connection between the upper end of shank 31' and the lower end of slide shaft 42'.

The use of the hole saw and unjamming tool disclosed in FIGS. 5-7 is similar to that of the FIG. 1-4 embodiment. The difference in the use of the embodiment of FIGS. 5-7 as compared with that of FIGS. 1-4 is that the step of forming the predrilled pilot hole is faciliated. In the use of the tool shown in FIGS. 5-7, the steps of predrilling the pilot hole and inserting the adapter member in the material to be cut are combined into one step and the step of cutting the hole in the material by the hole saw 10' can follow immediately thereafter in one continous operation as will be apparent from a consideration of FIG. 6.

The notched areas in which the slide hammer is attached is not the only method in which the pieces can be removed from the hole saw. The coupling portion described as 37 and 38 is an area in which an interlock can also be made with an hydraulic or pneumatic puller or other mechanicial devices which have a pulling force. According to this adaptation the hole saw is placed in the drill press and a hole is drilled through the desired material. As the parts 37 and 38 and the tip of the drill bit pass through the material and beneath the table an air compresser or pneumatic tool grasps onto parts 37 and 38 and holds them in place while the drill press is being withdrawn and this operation automatically removes the part.

It will be apparent that various changes may be made in the construction and arrangement of parts without departing from the scope of the invention as defined by the following claims. For example, in some applications a tool other than the specifically disclosed slide hammer may be utilized.

What is claimed is:

1. A hole saw unjamming tool for use with a hole saw having a cup-shaped cutter, a drive shaft, and a centering rod extending within the interior of the cutter along the central axis thereof, comprising:
   an adapter member including
   an elongated shank adapted to be received in a bore formed in the material to be cut,
   an enlarged head at one end of said shank for contacting the jammed material within the interior of the cutter, and
   interlock means formed at the other end of said shank; and
   a slide hammer including
   an elongated slide shaft,
   a weight slidably mounted on said slide shaft,
   a stop at one end of said slide shaft for arresting the movement of said weight therealong, and
   interlock means formed at the other end of said slide shaft adapted to be engaged with said interlock means of said adapter member.

2. A hole saw unjamming tool according to claim 1 wherein said adapter member has an elongated bore in said one end thereof extending along the longitudinal axis thereof and adapted to slidably receive the centering rod of the hole saw.

3. A hole saw unjamming tool according to claim 1 wherein said interlock means of said adapter member and said slide hammer are adapted to be releasably engageable so as to provide a quick-connect/disconnect coupling.

4. A hole saw unjamming tool according to claim 3 wherein said interlock means of said adapter member comprises an annular recess in said shank spaced axially inwardly from the tip of said one end of said shank and said interlock means of said slide hammer comprises a slot adapted to slidably receive the recessed portion of said interlock means of said adapter member and a cavity adapted to receive the portion of said shank between said annular recess and the tip of said one end of said shank.

5. A hole saw and unjamming tool according to claim 1 wherein said other end of said shank of said adapter member is formed with material cutting means to provide a drill bit for use in drilling a centering hole in the material to be cut.

6. A hole saw unjamming tool according to claim 5 wherein said adapter member has a bore in said one end thereof extending along the longitudinal axis thereof and adapted to receive the end of the centering rod of the hole saw, the outer end of said bore having a straightsided configuration so as to be engaged by a straightsided portion of the centering rod to provide for the conjoint rotation of the cutter and the adapter member.

7. A hole saw unjamming tool according to claim 5 wherein the drive shaft and centering rod of the hole saw are formed as a unitary structure with the centering rod providing an extension of the drive shaft.

8. A hole saw unjamming tool according to claim 1 wherein the drive shaft and centering rod of the hole saw are formed as a unitary structure with the centering rod providing an extension of the drive shaft.

9. A hole saw unjamming tool for use with a hole saw having a cup-shaped cutter, a drive shaft, and a centering rod extending within the interior of the cutter along the central axis thereof, comprising:
   an adapter member including
   an elongated shank adapted to be received in a bore formed in the material to be cut,
   an enlarged head at one end of said shank for contacting the jammed material within the interior of the cutter, and
   interlock means formed at the other end of said shank; and
   means for applying a force to said adapter member to remove the same and any jammed material from the interior of the cutter including
   interlock means adapted to be engaged with said interlock means of said adapter member.

10. A hole saw unjamming tool according to claim 9 wherein said adapter member has an elongated bore in said one end thereof extending along the longitudinal axis thereof and adapted to slidably receive the centering rod of the hole saw.

11. A hole saw unjamming tool according to claim 9 wherein said interlock means of said adapter member and said force applying means are adpated to be releasably engageable so as to provide a quick-connect/disconnect coupling.

12. A hole saw unjamming tool according to claim 11 wherein said interlock means of said adapter member comprises an annular recess in said shank spaced axially inwardly from the tip of said one end of said shank and said interlock means of said force applying means comprises a slot adapted to slidably receive the recessed portion of said interlock means of said adapter member and a cavity adapted to receive the portion of said shank between said annular recess and the tip of said one end of said shank.

13. A hole saw and unjamming tool according to claim 9 wherein said other end of said shank of said adapter member is formed with material cutting means to provide a drill bit for use in drilling a centering hole in the material to be cut.

14. A hole saw unjamming tool according to claim 13 wherein said adapter member has a bore in said one end thereof extending along the longitudinal axis thereof and adapted to receive the end of the centering rod of the hole saw, the outer end of said bore having a straightsided portion of the centering rod to provide for the conjoint rotation of the cutter and the adapter member.

15. A hole saw unjamming tool according to claim 13 wherein the drive shaft and centering rod of the hole saw are formed as a unitary structure with the centering rod providing an extension of the drive shaft.

* * * * *